United States Patent
Keithley

(10) Patent No.: US 8,194,282 B2
(45) Date of Patent: *Jun. 5, 2012

(54) IMAGE FORMING APPARATUS FOR IDENTIFYING UNDESIRABLE TONER PLACEMENT

(75) Inventor: Douglas G. Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,305

(22) Filed: May 6, 2011

(65) Prior Publication Data

US 2011/0205567 A1    Aug. 25, 2011

Related U.S. Application Data

(63) Continuation of application No. 12/353,176, filed on Jan. 13, 2009, now Pat. No. 7,957,030, which is a continuation of application No. 10/650,160, filed on Aug. 27, 2003, now Pat. No. 7,483,167.

(51) Int. Cl.
- *H04N 1/60* (2006.01)
- *G06F 15/00* (2006.01)
- *G06F 3/12* (2006.01)

(52) U.S. Cl. .................... 358/1.9; 358/1.2; 358/1.13

(58) Field of Classification Search ............ 358/1.1, 358/1.9, 1.11–1.18; 382/165, 170, 173, 181, 382/254, 255, 267–269

See application file for complete search history.

(56) References Cited

U.S. PATENT DOCUMENTS

| | | | |
|---|---|---|---|
| 4,776,023 A | 10/1988 | Hamada et al. |
| 4,817,179 A | 3/1989 | Buck |
| 4,868,684 A | 9/1989 | Suzuki |
| 5,005,139 A | 4/1991 | Tung |
| 5,144,338 A | 9/1992 | Sakano |
| 5,235,650 A | 8/1993 | Jeong |
| 5,237,646 A | 8/1993 | Bunce |
| 5,357,583 A | 10/1994 | Sato et al. |
| 5,392,061 A | 2/1995 | Vondran, Jr. |
| 5,440,407 A | 8/1995 | Overton |
| 5,483,355 A | 1/1996 | Overton |
| 5,483,625 A | 1/1996 | Robertson et al. |
| 5,581,292 A | 12/1996 | Cianciosi et al. |
| 5,630,026 A | 5/1997 | Ogletree et al. |
| 5,659,849 A | 8/1997 | Lindblad et al. |
| 5,784,091 A | 7/1998 | Ema et al. |
| 5,801,843 A | 9/1998 | Overton |
| 5,812,742 A | 9/1998 | Hanyu |
| 6,167,509 A | 12/2000 | Sites et al. |

(Continued)

FOREIGN PATENT DOCUMENTS

GB    2250397    6/1996

(Continued)

OTHER PUBLICATIONS

Examination Report for Great Britain counterpart Application No. GB0416743.3; Mar. 3, 2006; 2 pages.

(Continued)

*Primary Examiner* — Thierry Pham

(57) ABSTRACT

A method and apparatus for printing data on a print medium is disclosed. The apparatus is configured to format print data to pixel data, the pixel data including pixel values; identify a grid of pixels having a predetermined pattern of pixel values; obtain predetermined pcode grid from memory for the identified grid of pixels; and send the predetermined pcode grid to controller circuit for printing.

17 Claims, 7 Drawing Sheets

U.S. PATENT DOCUMENTS

| | | | |
|---|---|---|---|
| 6,178,011 B1 | 1/2001 | Lin et al. | |
| 6,250,742 B1 | 6/2001 | Kido | |
| 6,304,278 B1 | 10/2001 | Coleman | |
| 6,321,055 B1 | 11/2001 | Mashtare et al. | |
| 6,333,998 B1 | 12/2001 | Matsumoto | |
| 6,342,953 B1 | 1/2002 | Wibbels et al. | |
| 6,415,062 B1 | 7/2002 | Moed et al. | |
| 6,571,080 B2 | 5/2003 | Lee et al. | |
| 6,580,896 B2 | 6/2003 | Lee | |
| 6,760,126 B1 | 7/2004 | Kritayakirana et al. | |
| 6,819,452 B1 * | 11/2004 | Richtsmeier et al. | 358/1.9 |
| 6,850,651 B2 | 2/2005 | Zaklika et al. | |
| 7,003,174 B2 | 2/2006 | Kryukov et al. | |
| 7,031,025 B1 | 4/2006 | He et al. | |
| 7,173,734 B2 | 2/2007 | Klassen et al. | |
| 7,251,061 B2 * | 7/2007 | Larson et al. | 358/3.27 |
| 7,483,167 B2 | 1/2009 | Keithley | |
| 7,957,030 B2 * | 6/2011 | Keithley | 358/1.9 |
| 2002/0115011 A1 | 8/2002 | Komoto et al. | |
| 2002/0195053 A1 | 12/2002 | Mey et al. | |
| 2003/0048472 A1 | 3/2003 | Perdu et al. | |
| 2003/0134215 A1 | 7/2003 | Kashiwabara et al. | |
| 2003/0138711 A1 | 7/2003 | Kabata et al. | |
| 2003/0231350 A1 | 12/2003 | Yamagishi | |

FOREIGN PATENT DOCUMENTS

| | | |
|---|---|---|
| GB | 2405510 | 3/2005 |
| JP | 04-068370 | 3/1992 |
| JP | 05-167850 | 7/1993 |
| JP | 07-193722 | 7/1995 |
| JP | 09-065141 | 3/1997 |
| JP | 09-085993 | 3/1997 |
| JP | 10-006560 | 1/1998 |
| JP | 10-290369 | 10/1998 |
| JP | 2854179 | 11/1998 |
| JP | 11-034401 | 2/1999 |
| JP | 2000-125128 | 4/2000 |
| JP | 2000-141751 | 5/2000 |
| JP | 2001-080112 | 3/2001 |
| JP | 2001-197309 | 7/2001 |
| JP | 2002-118748 | 4/2002 |

OTHER PUBLICATIONS

GB Search Report for Application No. GB0522057.9 mailed Dec. 16, 2005; 3 pages.

* cited by examiner

| 73 | | | | | |
|---|---|---|---|---|---|
| (0, 0) | (0, 0) | (0, 0) | (0, 0) | (0, 0) | (0, 0) |
| (0, 31) | (0, 0) | (0, 31) | (0, 0) | (0, 31) | (0, 0) |
| (0, 0) | (0, 31) | (0, 0) | (0, 31) | (0, 0) | (0, 31) |
| (0, 31) | (0, 0) | (0, 31) | (0, 0) | (0, 31) | (0, 0) |
| (0, 0) | (0, 31) | (0, 0) | (0, 31) | (0, 0) | (0, 31) |
| (0, 0) | (0, 0) | (0, 0) | (0, 0) | (0, 0) | (0, 0) |
FIG. 7A
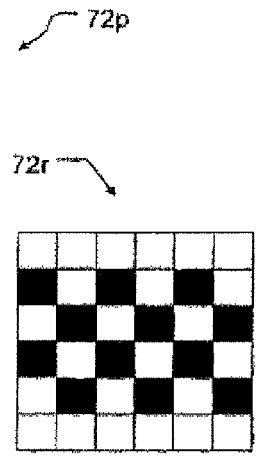
FIG. 7B
| 75 | | | | | |
|---|---|---|---|---|---|
| (0, 0) | (0, 0) | (0, 0) | (0, 0) | (0, 0) | (0, 0) |
| (3, 16) | (3, 16) | (3, 16) | (3, 16) | (3, 16) | (3, 16) |
| (0, 16) | (0, 16) | (0, 16) | (0, 16) | (0, 16) | (0, 16) |
| (2, 16) | (2, 16) | (2, 16) | (2, 16) | (2, 16) | (2, 16) |
| (1, 16) | (1, 16) | (1, 16) | (1, 16) | (1, 16) | (1, 16) |
| (0, 0) | (0, 0) | (0, 0) | (0, 0) | (0, 0) | (0, 0) |
FIG. 8A
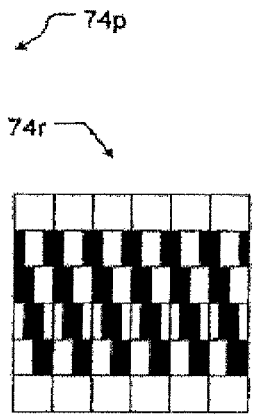
FIG. 8B

IMAGE FORMING APPARATUS FOR IDENTIFYING UNDESIRABLE TONER PLACEMENT

CROSS-REFERENCE TO RELATED APPLICATIONS

This Application is a continuation of U.S. application Ser. No. 12/353,176, filed Jan. 13, 2009, which is a continuation of U.S. application Ser. No. 10/650,160, filed Aug. 27, 2003. The disclosures of the applications referenced above are incorporated herein by reference.

BACKGROUND

This invention generally relates to laser printers and more particularly, the present invention relates to laser printers having selectable printing resolutions.

Laser printers have become a de facto standard appliance in the art of printing. Laser printers print by depositing, using electrostatic charges, very finely manufactured toner on selected portions of print media such as paper then fusing the toner onto the paper using heat and pressure. Research in the laser printing technology resulted in the development of laser printers having resolutions in excess of 600 by 600 DPI (dots-per-inch) or even more. For such a printer, characters and marks on each page are defined by a grid of pixels, each pixel being 1/600th inch on each side.

Basic operations of a laser printer are discussed with reference to FIG. 1. FIG. 1 is a simplified schematic diagram of a laser printer 10. The laser printer 10 receives print data 12 from a host computer 14 connected to the laser printer 10. A processor 16 of the laser printer 10 formats the print data 12. That is, the processor 16 is adapted to process the print data 12 to produce pixel data representing a grid of pixels on a print medium such as paper. Often, each pixel is represented in the pixel data by one binary digit (a bit) with 0 assigned to one state (for example, off) and 1 assigned to another state (for example, on).

FIG. 2A illustrates a 12 pixel by 12 pixel sample grid 20 of pixel data. As illustrated, some pixels are in an on-state (for example, pixel 22) while other pixels are in the off-state (for example, pixel 24).

For each pixel of the pixel data, the processor 16 translates the pixel value to a pulse-width-modulation code, and sends the pulse-width-modulation code to a controller circuit 18 which controls the operations of various electro-optical-mechanical devices 19 of the printer 10. The electro-optical-mechanical devices 19 include, for example, a laser, a mirror, a drum, corona wires, rollers, lamps, a fuser, and various sensors. The sample pixel grid 20, when printed on paper, can appear as illustrated in FIG. 2B and folios a letter "A." As illustrated, in the present example, to form the letter "A," the print data 12 was formatted to pixel data including a grid of pixels having off-state (0) and on-state (1) values. Toner was applied to the print medium such as paper for the pixels represented by the on-states. Then, the toner is fused onto the paper using heat and pressure applied to the paper by a fuser.

For convenience, the pulse-width-modulation code is referred to as a pcode in this document. The processor 16 translates each pixel value into a pcode. The pcode is a set of two values often designated (j, p) where j is the justification value and p is the pulse width value which correlates to the width of pigmentation that can be laid down for a particular pixel. The pcode is used because, in most laser printers, the placement of the toner particles can have a finer adjustment even within a single pixel. Such fine adjustments are possible through the use of narrow laser beams, fine mirror controls, and very small toner particles.

For example, j can be set at 0, 1, 2, or 3 to indicate that the pigmentation for a particular pixel should be left justified, right justified, centered, or split within the pixel. Further, p can range within a predetermined range of numbers for adjustment of the pulse width value. Typically, p can range from 0 to 31 to provide for 32 different widths of the pigmentation within a pixel with 0 indicating no toner applied, 31 indicating toner applied to the entire width, and all numbers between 0 and 31 indicating toner applied to a corresponding portion of the pixel.

FIG. 2C illustrates pcodes for a portion 26 of the sample grid 20. For the sample grid 20, the off-pixels such as the off-pixel 24 have the pulse width value of 0 which correlates to no toner applied to these pixels. For these pixels, the justification value is not relevant since no toner is applied. The on-pixels such as the on-pixel 22 have the pulse width value of 31 which correlates to toner applied to the entire width of these pixels. Also for these pixels, the justification value is not relevant since the entire pixel is covered.

Other possible pcodes and their results as printed pixels are illustrated in FIGS. 3A and 3B. As illustrated, pixels 30, 32, 34, 36, 38, and 40 have pcodes, respectively, of (0, 0), (0, 15), (1, 15), (2, 7), (3, 15), and (0, 31). Pixel 30, having the pulse width value of 0, has no pigmentation within the pixel 30. For pixel 30 its justification value is irrelevant. Pixel 32 has pulse with of 15 (which is 16 counting from 0, 50 percent of 32 possible values) and justification code 0 (left justified). Accordingly, left 50 percent 33 of the pixel 32 is covered. Pixel 34 has pulse width of 15 and justification code 1 (right justified). Accordingly, right 50 percent 35 of the pixel 34 is covered. Pixel 36 has pulse width value of 7 (which is 8 counting from 0, 25 percent of 32 possible values) and justification code 2 (centered). Accordingly, center 25 percent 37 of the pixel 36 is covered. Pixel 38 has pulse width value of 15 and justification code 3 (split). Accordingly, 25 percent of left side and 25 percent of right side (collectively 39) of the pixel 38 is covered. Pixel 40, having the pulse width value of 31, the maximum value. Accordingly, the entire width of the pixel 40 is covered by the toner. For pixel 40 its justification value is irrelevant.

Generally, as illustrated in FIGS. 2A through 2C, each on-pixel is fully covered with pigmentation and each off-pixel is left completely uncovered. However, for certain characters or marks on the print medium, such technique imposes limitations, lead to undesirable results, or both.

For example, it would be desirable to adjust or set the pcodes of certain pixels to vary print quality, to produce desired effects on the print medium, alleviate or eliminate unwanted results, or a combination of these.

One approach to vary print quality (for example to produce a draft quality document while reducing toner usage) is to use a single, predetermined pcode (rather than the translated pcode) for selected pixels. However, this approach is limited to using the same predetermined pcode irrespective of the context in which the pixel was selected. Thus, the predetermined pcode may not be the optimum, or even appropriate, pcode for the selected pixel. Further, such approach does not address certain undesirable effects such as toner explosion.

Toner explosion occurs during the fusing process. When the fuser applies heat and pressure to paper and toner on the paper, the toner melts and fuses with the fibers of the paper. During the fusing process, the heat and the pressure generate gas and water vapor within the paper. Normally, such gas and water vapor leave the paper without interfering with the melting toner; however, certain patterns of toner prevent efficient ventilation of the gas and water vapor leading to scattering of toner on the page resulting in a defective image. The current techniques are limited in their ability to eliminate such conditions.

Accordingly, there remains a need for an improved method and apparatus to alleviate or eliminate the shortcoming of the current generation of printers.

SUMMARY

The need is met by the present invention. According to a first embodiment of the present invention, an apparatus having a processor is disclosed. The processor is adapted to perform a number of operations including operations to identify a grid of pixels having a predetermined pattern of pixel values; to obtain predetermined pcode grid from memory for the identified grid of pixels; and to send the predetermined pcode grid to controller circuit for printing.

In a second embodiment of the present invention a method of printing data on a print medium is disclosed. First, print data is formatted to pixel data, the pixel data including pixel values. Next, a grid of pixels having a predetermined pattern of pixel values is identified. Then, predetermined pcode grid is obtained from memory for the identified grid of pixels. Finally, the predetermined pcode grid is sent to controller circuit for printing.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 7A and 7B, illustrate another sample pulse-width-modulation codes and corresponding toner distribution; and FIGS. 8A and 8B, illustrate yet another sample pulse-width-modulation codes and corresponding toner distribution.

DETAILED DESCRIPTION

The present invention will now be described with reference to FIGS. 1 through 8B, which illustrate various embodiments of the present invention. As illustrated in the Figures, relative sizes of various portions, structures, or any combination of these are exaggerated for illustrative purposes and, thus, are provided to illustrate the general structures of the present invention.

As shown in the Figures for the purposes of illustration, one embodiment of the present invention is exemplified by an apparatus, for example a printer. The printer has a processor adapted to identify a grid of pixels having a predetermined pattern of pixel values, obtain predetermined pcode grid from memory for the identified grid of pixels, and send the predetermined p code grid to controller circuit for printing.

The predetermined pattern is chosen such that it is the pattern that may lead to undesirable toner placement such as the toner explosion were the pixels (of the grid matching the predetermined pattern) translated to pcodes in the usual manner. The predetermined pcode grid leads to desirable toner placement. Using this technique, print quality, toner usage, and color effects can be adjusted while eliminating undesired results such as the toner explosion problem.

Figure 1:
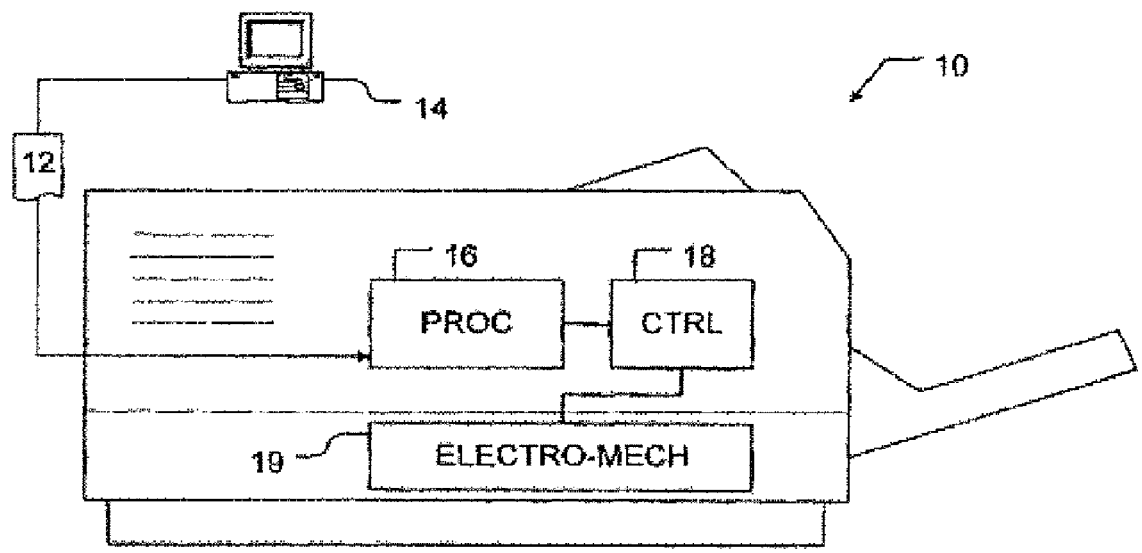
FIG. 1 is a simplified schematic view of a prior art apparatus.
Figure 2C:
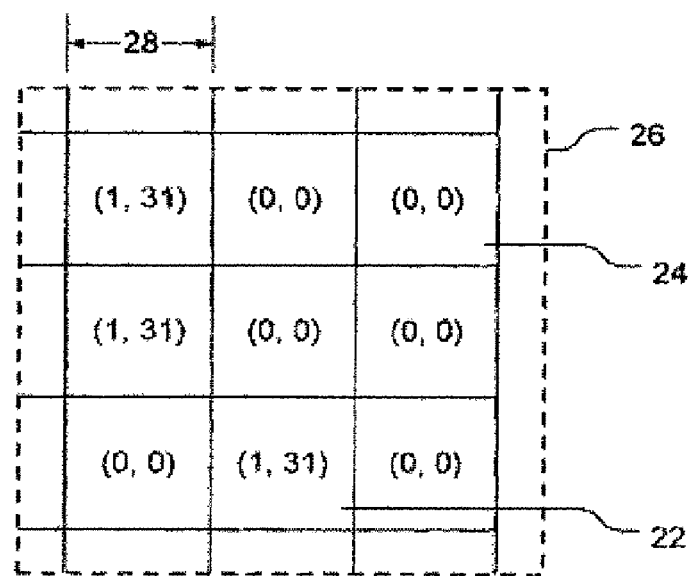
FIG. 2C illustrates pulse-width-modulation code values for a portion of the sample grid of FIG. 2A.
Figure 2A:
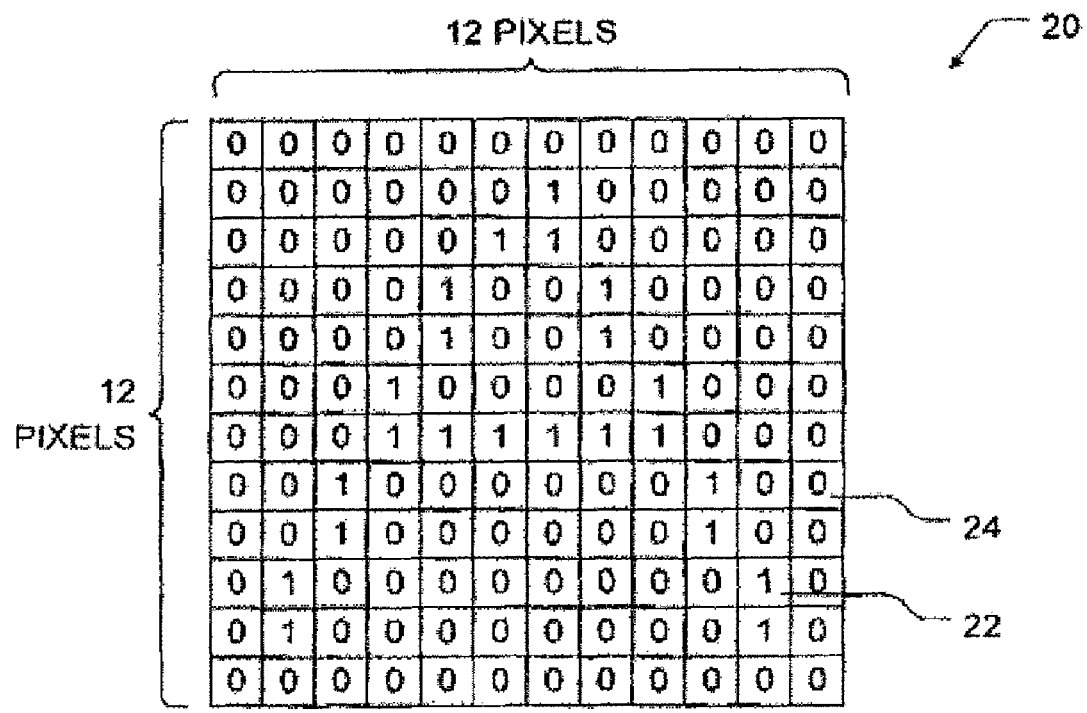
FIG. 2A illustrates a 12 pixel by 12 pixel sample grid of pixel data.
Figure 2B:
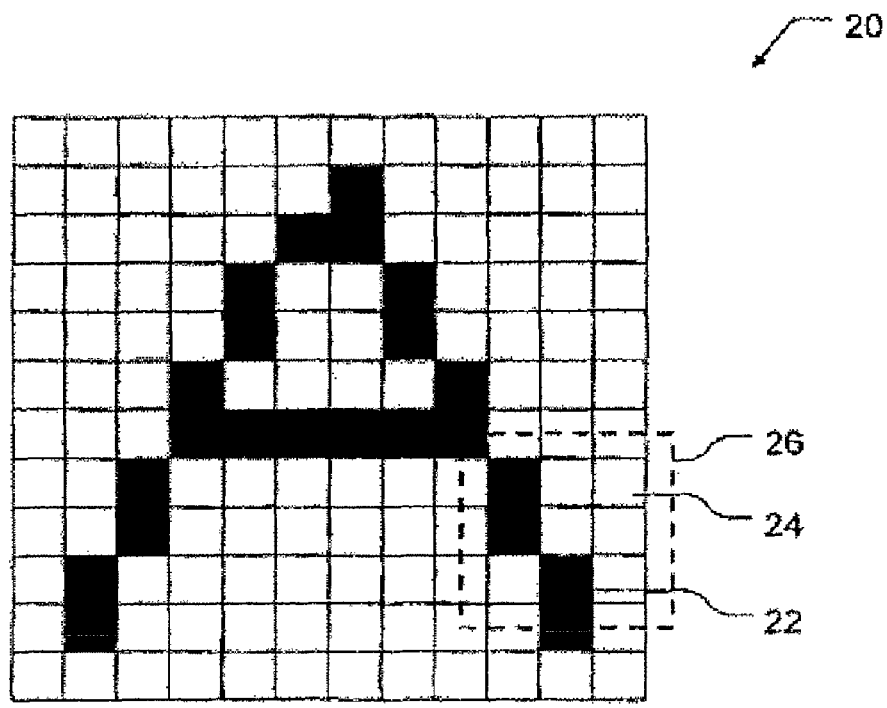
FIG. 2B illustrates toner placement on a print medium for the sample grid of FIG. 2A.
Figure 3A:
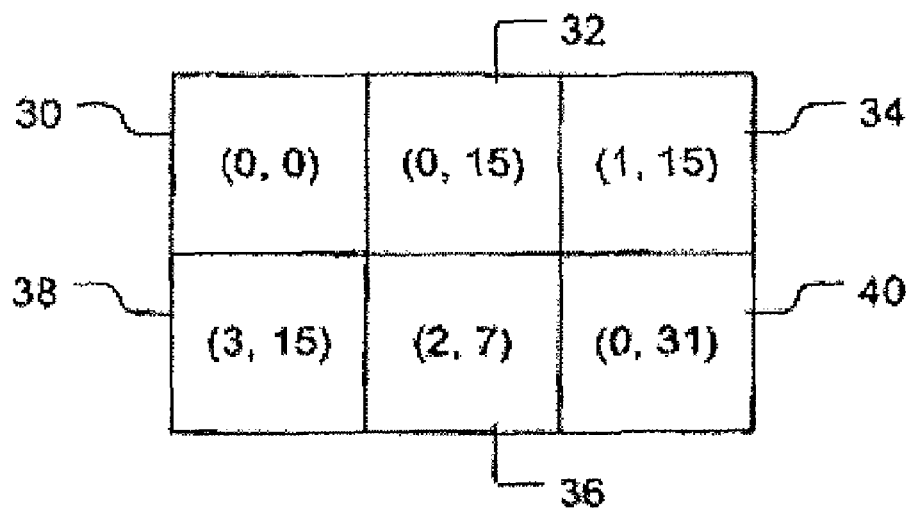
FIGS. 3A and 3B illustrate other sample pulse-width-modulation code values and resulting toner distribution.
Figure 3B:
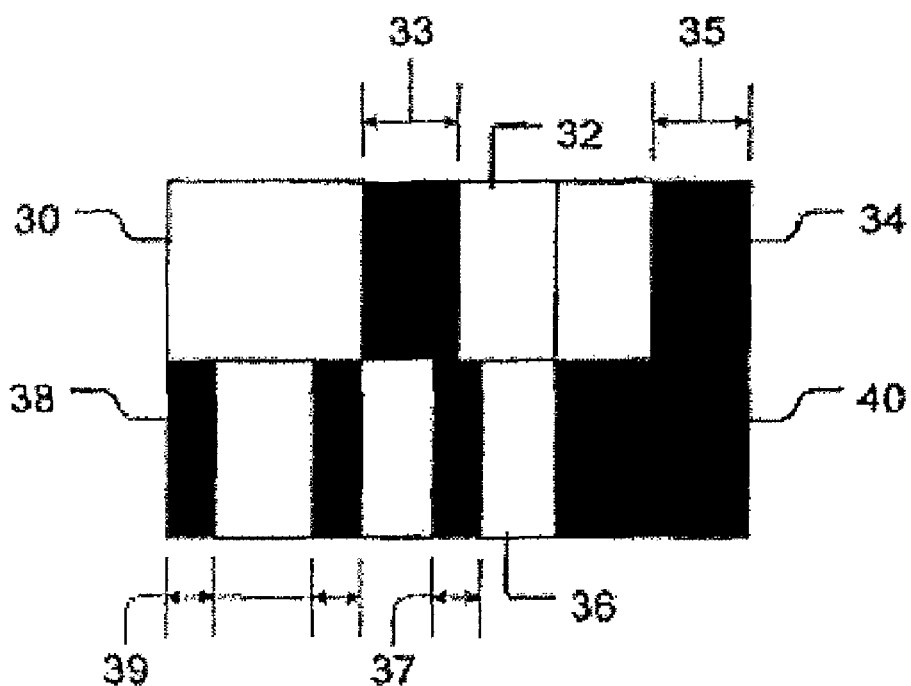
Figure 4A:
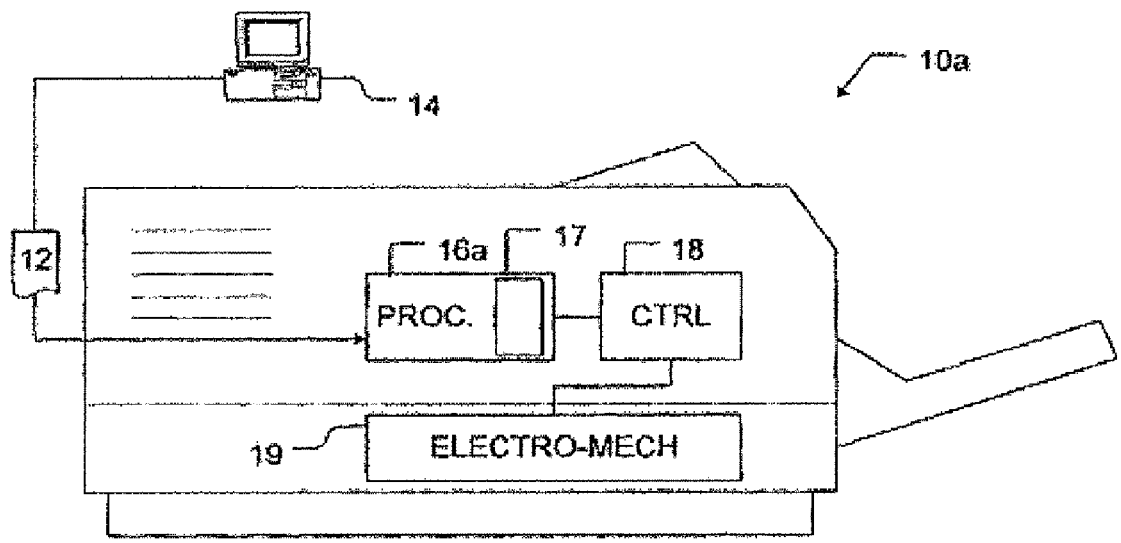
FIGS. 4A and 4B are simplified schematic view of apparatuses in accordance with embodiments of the present invention.

FIG. 4A illustrates an apparatus 10a, for example a printer 10a according to a first embodiment of the present invention. The printer 10a of FIG. 4A includes components that are similar to corresponding components of the printer 10 of FIG. 1. For convenience, components in FIG. 4A that are similar to corresponding components in FIG. 1 are assigned the same reference numbers. Similar but changed components are assigned the same reference numbers accompanied by letter "a." Different components are assigned different reference numbers. The apparatus 10a can be, for example, a printer, a copier, or a multifunction appliance that typically include printer function, copier function, or both.

Figure 4B:
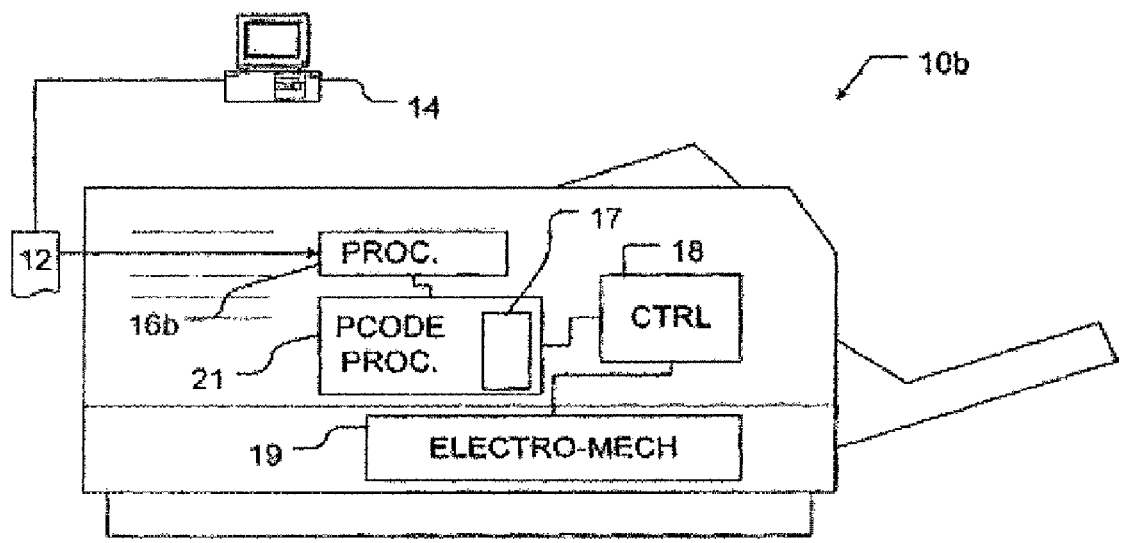

FIG. 4B illustrates an apparatus 10b, for example a printer 10b according to a second embodiment of the present invention. The printer 10b of FIG. 4B includes components that are similar to corresponding components of the printer 10 of FIG. 1. For convenience, components in FIG. 4B that are similar to corresponding components in FIG. 1 are assigned the same reference numbers. Similar but changed components are assigned the same reference numbers accompanied by letter "b." Different components are assigned different reference numbers. The apparatus 10b can be, for example, a printer, a copier, or a multifunction appliance that typically include printer function, copier function, or both.

The printer 10a of FIG. 4A includes a processor 16a adapted or programmed to perform operations implementing the present invention. In the second embodiment, the printer 10b of FIG. 4B includes a PCODE processor 21 adapted to or programmed to perform operations implementing the present invention. The PCODE processor can be a dedicated hardware for the specific task of performing the operations implementing the present invention and need not be a general processor.

Figure 5:
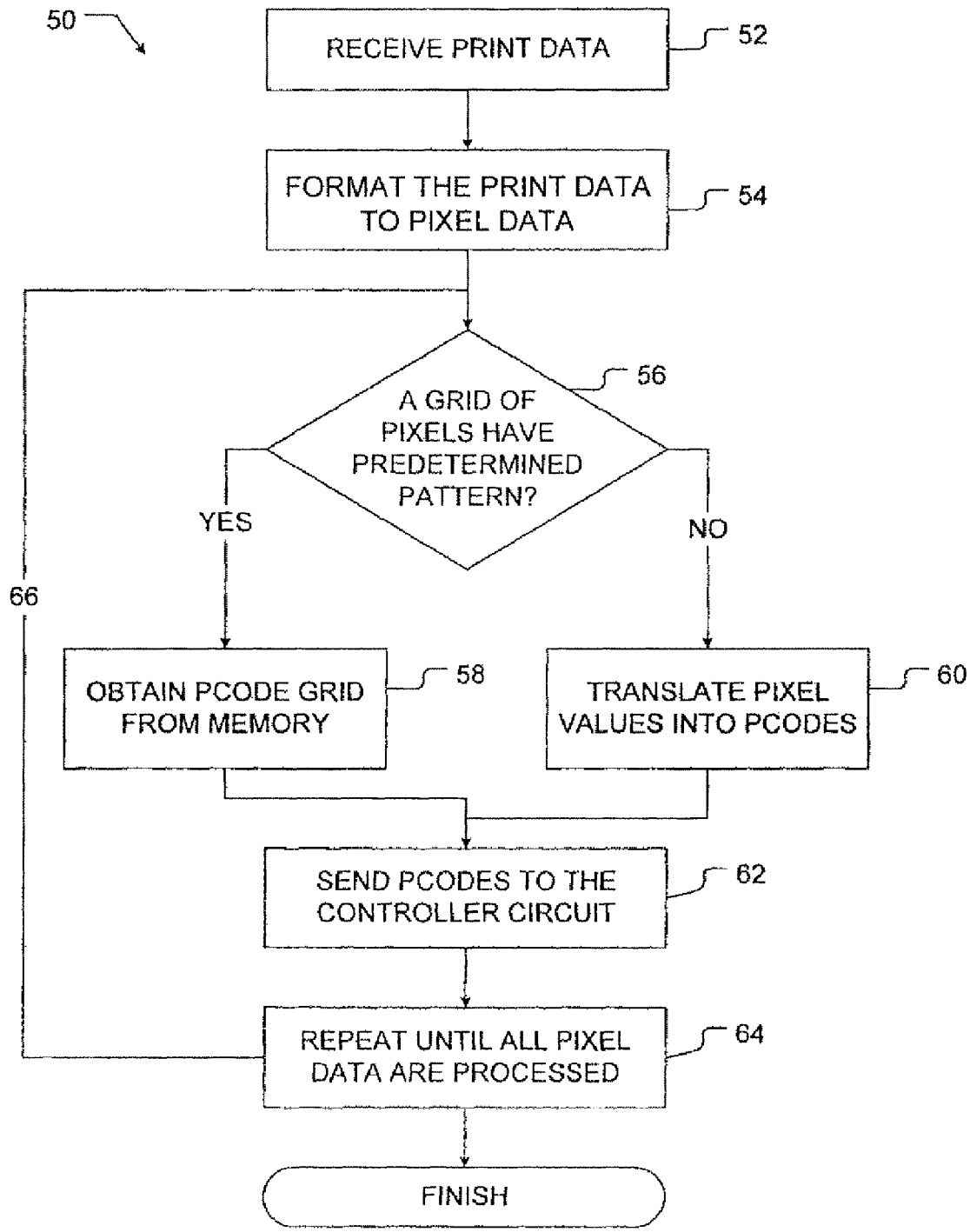
FIG. 5 is a flowchart illustrating steps of one embodiment of the present invention.

The operations of the processors 16a and 16b, PCODE processor 21, or both are explained using a flowchart 50 of FIG. 5. For convenience, in the following discussion and in the Claims, the term "processor" designates processors 16a, 16b, PCODE processor 21, any one of these, or any combination of these unless otherwise denoted. This is because the processors 16a, 16b, PCODE processor 21, any one of these, or any combination of these are sufficiently malleable and configurable to perform any portion of the operations implementing the present invention.

Referring to FIGS. 4A, 4B, and 5, the processor (16a, 16b, 21, or any one or combination of these) is adapted to receive and format a print data 12 from a host computer 14. These operations are represented in the flow chart 50 as procedural step boxes 52 and 54. The processor (16a, 16b, 21, or any one or combination of these) formats the print data 12. Step 54. That is, the processor (16a, 16b, 21, or any combination of them) is adapted to process the print data 12 to produce pixel data representing a grid of pixels on a print medium such as paper. Typically, each pixel is represented in the pixel data by one binary digit (a bit) with 0 assigned to one state (for example, off) and 1 assigned to another state (for example, on).

The processor (16a, 16b, 21, or any one or combination of these) is adapted to examine the entire pixel data. For each pixel, the processor (16a, 16b, 21, or any one or combination of these) examines its surrounding grid of pixels to determine whether the grid of pixels under examination matches a predetermined pattern. Decision step 56. The predetermined pattern can be any pattern.

Figures 6A, 6B, 6C:
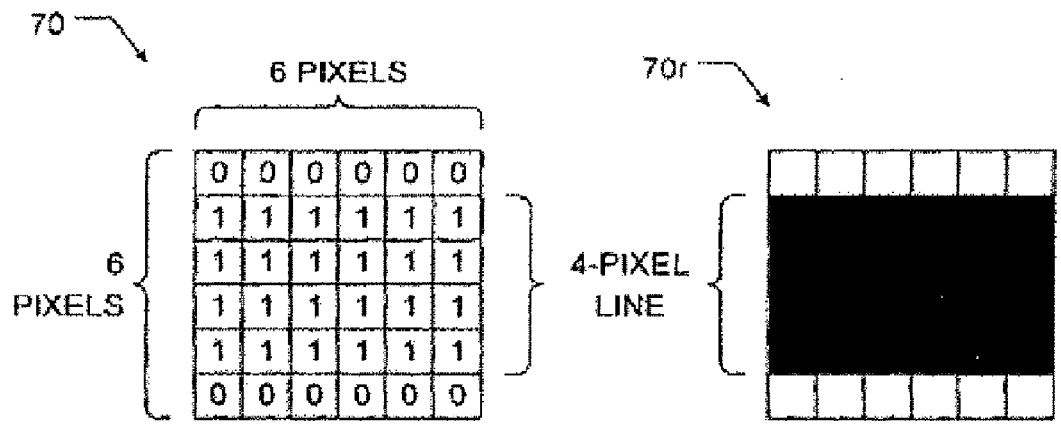
FIGS. 6A, 6B, and 6C illustrate sample pixel values, sample pulse-width-modulation codes and corresponding toner distribution.

For example, FIG. 6A show a sample grid of pixels 70 under examination by the processor (16a, 16b, 21, or any one or combination of these). In the illustrated sample, the sample grid of pixels 70 is a 6 pixel by 6 pixel grid having a 4-pixel-thick horizontal "line." One the one hand, if the sample grid of pixels 70 is not identical to the predetermined pattern, then no match is found. Then the processor (16a, 16b, 21, or any one or combination of these) translates each pixel value (either 0 or 1) of the sample grid of pixels 70 into its corresponding pcode. Step 60. Typically the off-pixels are assigned pcode (0, 0) indicating pulse width value of 0 for no coverage and on-pixels are assigned pcode (0, 31) indicating pulse width value of 31 for full coverage. The pcodes corresponding to the sample grid of pixels 70 is illustrated as a grid of pcodes 70p in FIG. 6B. In FIG. 6B, the grid of pcodes 70p is illustrated using larger size pixels (compared to size of the pixels of the sample grid of pixels 70) so that the pcode values for each pixel can be illustrated using legible font size. Otherwise, the larger illustrated size is irrelevant. The pcodes illustrated in FIG. 6B is then sent to the controller circuit 18 of FIG. 4, resulting in an area 70r on the paper that appears as illustrated in FIG. 6C. Step 62.

On the other hand, if the sample grid of pixels 70 is identical to the predetermined pattern, then match is found. Then the processor (16a, 16b, 21, or any one or combination of these) obtains a predetermined pcode grid from memory 17 of FIG. 4. Step 58. The memory 17 can be one or more registers within the processor (16a, 16b, 21, or any one or combination of these) as illustrated. Alternatively, the memory 17 can reside outside the processor (16a, 16b, 21, or any one or combination of these). The predetermined pcode grid is sent to the controller circuit 18 of FIG. 4 for printing. Step 62.

The pcode for each of the pixels of the sample grid of pixels 70 is found in the corresponding position within the predetermined Node grid. A first sample predetermined pcode grid 72p is illustrated in. FIG. 7A and resulting toner pattern in FIG. 7B. Here, the off-pixels of the sample grid of pixels 70 are left unchanged, and the on-pixels of the sample grid of pixels 70 are assigned pcodes to produce a checker-board patterned area 72r on paper. The illustrated check-board pattern shows a 45 degree toner placement.

A second sample predetermined pcode grid 74p is illustrated in FIG. 8A and resulting toner pattern in FIG. 8B. Here, the off-pixels of the sample grid of pixels 70 are left unchanged, and the on-pixels of the sample grid of pixels 70 are assigned pcodes to produce a higher frequency checkerboard patterned area 74r on paper. Also, the illustrated check-board pattern shows a toner placement angle at an angle other than 45 degrees.

It is possible to configure the predetermined pcode grid can have many different patterns resulting in toner placement patterns, each placement pattern corresponding to its pcode grid pattern. For example, predetermined pcode grid can have various half-toning patterns, dots patterns, higher or lower frequency patterns, at various angles, random patterns, or any combination of these patterns. The predetermined pcode grid can be patterned for various purposes. For example, to save toner, to overcome toner explosion problems, or both.

Further, the pcode grid 72p or 74p of FIGS. 7A and 8A need not be the exact size of or as large as the sample grid of pixels 70 of FIG. 6A. Note that for the pcode grid 72p, the first two columns 73 repeat and that for the pcode grid 74p, the first column 75 repeats. Indeed, the memory 17 can store only sufficient columns, row, or columns and rows to define a pcode grid pattern that can be repeated to implement the sample grid of pixels 70. For example, if a line (having a sample grid of pixels) is 5000 pixels wide, the replacement pcode grid need not be 5000 pixels wide. In the examples given in FIG. 8A, the pcode grid 74b only has to be one pixel wide since it does not change in the horizontal direction. Pcode grids can be implemented in any useful size, but sizes in the order of several pixels, for example 3-pixel grid or 8-pixel grid, in column, in width, or both is sufficient. The predetermined pixel grid can be determined using any method. For example, Holliday algorithm can be used to determine the predetermined pixel grid.

For color printers utilizing a pcode grid for each of its colors, the present inventive technique can be applied to each of the colors to produce a desired hue or tone of the color. In such a case, different predetermined pattern, predetermined pcode grid, or both can be applied to each of the available colors. That is, a first predetermined pattern and its corresponding pixel Did applies to a first color and a second predetermined pattern and its corresponding pixel grid applies to a second color.

As indicated by step 64 and loop 66, steps 56, 58, 60 and 62 discussed above are repeated until all the pixels are processed.

In the illustrated embodiment of FIG. 4A, the processor 16a of FIG. 4A is adapted or programmed to perform the functions of the steps of FIG. 5. In the illustrated embodiment of FIG. 4B, the processor 16b of FIG. 4B is adapted or programmed to perform some of the functions of the steps of FIG. 5 while the PCODE processor 21 is adapted or programmed to perform other the functions of the steps of FIG. 5. Specifically, functions illustrated as steps 56 through 64 of FIG. 5 is implemented using the PCODE processor 21.

From the foregoing, it will be appreciated that the present invention is novel and offers advantages over the current art. Although a specific embodiment of the invention is described and illustrated above, the invention is not to be limited to the specific forms or arrangements of parts so described and illustrated. For example, the print data can be compressed or decompressed during various processing steps as desirable. The invention is limited by the claims that follow.

What is claimed is:

1. An apparatus comprising:
   a memory configured to store a plurality of predetermined grids, wherein each location in the plurality of predetermined grids includes a pcode comprising a justification value and a pulse width value;
   pcode circuitry configured to:
   compare a predetermined pattern to a plurality of pixels in image data in order to examine image data; and
   generate a command signal based on the comparison and select one of the plurality of predetermined grids from the memory to replace at least the plurality of pixels in the image data for printing,
   wherein the predetermined pattern corresponds to a risk of toner scattering, and
   wherein the toner scattering is caused by a lack of ventilation when toner is fused to paper.

2. The apparatus of claim 1, wherein the pcode circuitry is dedicated hardware for processing the image data.

3. The apparatus of claim 1, further comprising:
controller circuitry configured to interpret the one of the plurality of predetermined grids into commands for a laser.

4. The apparatus of claim 1, wherein at least one of the plurality of predetermined grids corresponds to a toner placement pattern with low risk of toner scattering.

5. The apparatus of claim 1, wherein each of the predetermined grids corresponds to a number of pixels greater than a number of the plurality of pixels such that the pcode circuitry replaces more pixels than the plurality of pixels with the one of the plurality of predetermined grids.

6. The apparatus of claim 1, wherein the apparatus is a printer, a copier, or a multifunctional appliance and a laser is configured to expose a drum in the apparatus.

7. The apparatus of claim 1, wherein at least one of the plurality of predetermined grids corresponds to a toner placement pattern that uses less toner than the predetermined pattern.

8. The apparatus of claim 1, wherein the plurality of predetermined grids includes a first predetermined grid corresponding to a first color and a second predetermined grid corresponding to a second color.

9. The apparatus of claim 8, wherein the first predetermined grid is applied at the plurality of pixels and the second predetermined grid is not applied at the plurality of pixels.

10. A method comprising:
storing a plurality of predetermined grids in a memory, wherein each location in the plurality of predetermined grids includes a pcode comprising a justification value and a pulse width value;
comparing, with pcode circuitry, a toner condition pattern to a plurality of pixels in image data;
generating, with the pcode circuitry, a command signal when the plurality of pixels matches the toner condition pattern; and
outputting one of the plurality of predetermined grids to a laser based on the command signal, wherein the toner condition pattern corresponds to a risk of toner scattering or toner explosion and the toner scattering or toner explosion is caused by a lack of ventilation when toner is fused to paper.

11. The method of claim 10, wherein at least one of the plurality of predetermined grids corresponds to a toner placement pattern with low risk of toner scattering, toner explosion, or an overuse of toner.

12. The method of claim 10, wherein each of the predetermined grids corresponds to a number of pixels greater than a number of the plurality of pixels such that the one of the plurality of predetermined grids replaces more pixels than the plurality of pixels.

13. The method of claim 10, wherein the laser is configured to expose a drum in a printer, a copier, or a multifunctional appliance.

14. The method of claim 10, wherein at least one of the plurality of predetermined grids corresponds to a toner placement pattern that uses less toner than the predetermined pattern.

15. The method of claim 10, wherein the plurality of predetermined grids includes a first predetermined grid corresponding to a first color and a second predetermined grid corresponding to a second color.

16. The method of claim 15, wherein the first predetermined grid is applied at the plurality of pixels and the second predetermined grid is not applied at the plurality of pixels.

17. An apparatus comprising:
a memory configured to store a plurality of predetermined grids, wherein each location in the plurality of predetermined grids includes a pcode; and
pcode circuitry configured to:
compare a predetermined pattern to a plurality of pixels in image data in order to examine image data; and
generate a command signal based on the comparison and select one of the plurality of predetermined grids from the memory to replace at least the plurality of pixels in the image data for printing,
wherein the predetermined pattern corresponds to a risk of toner scattering, and
wherein the toner scattering is caused by a lack of ventilation when toner is fused to paper.

* * * * *